United States Patent [19]

Mogi et al.

[11] Patent Number: 4,712,637

[45] Date of Patent: Dec. 15, 1987

[54] STRADDLE TYPE VEHICLE SEAT ASSEMBLY

[75] Inventors: Tomonori Mogi; Yoshiaki Kashio, both of Saitama, Japan

[73] Assignee: Honda Giken Kogyo Kabushiki Kaisha, Tokyo, Japan

[21] Appl. No.: 876,973

[22] Filed: Jun. 20, 1986

[30] Foreign Application Priority Data

Jun. 20, 1985 [JP] Japan .............................. 60-092228
Jun. 20, 1985 [JP] Japan .............................. 60-092229

[51] Int. Cl.4 ........................ B62K 11/04; B62K 19/30
[52] U.S. Cl. ................................ 180/219; 280/5 A
[58] Field of Search ............... 180/219, 229; 280/5 A; 297/444, 195, 214

[56] References Cited

U.S. PATENT DOCUMENTS

2,190,992  2/1940  Misinger ........................... 297/214
4,457,524  7/1984  Yoshiwara ......................... 180/219
4,629,201  12/1986 Tsukiji ............................. 280/5 A Primary Examiner—John J. Love
Assistant Examiner—Donn McGiehan
Attorney, Agent, or Firm—Lyon & Lyon

[57] ABSTRACT

In a saddle type vehicle wherein a front portion of a saddle type seat covers a rearward portion of a fuel tank placed above the engine on a small vehicle frame, both side portions of the forward portion of the saddle type seat are engaged to attachment members located on the rear portion of the fuel tank. Rubber grommets may be employed between the saddle type seat and the fuel tank for reducing vibration. Plugs extending outwardly from the attachment members on the fuel tank could be employed to engage blind holes in vibration isolating members held within projections of the seat frame structure to retain the forward portions of the saddle type seat flush with the fuel tank.

6 Claims, 14 Drawing Figures

STRADDLE TYPE VEHICLE SEAT ASSEMBLY

BACKGROUND OF THE INVENTION

The field of the present invention is saddle type seat arrangements for small vehicles to be straddled by a rider or riders.

Saddle type seats for vehicles have long been employed on motorcycles, motor tricycles and the like which are positioned behind a fuel tank located on the forward portion of the frame above an engine between the front and rear wheels of the vehicle. Often the front portion of such a saddle type seat which often is generally U-shaped in cross section extends slightly forwardly to cover a rearward portion of the fuel tank.

To accommodate the forward portion of the saddle type seat, it is common for the rear portions of fuel tanks to be slightly reduced in size on the top and side walls to form a stepped portion. The seat then fits forwardly into the stepped portion such that the front end periphery of the saddle type seat is flush with the main portion of the fuel tank to give a smooth, continuous and integral appearance.

Such straddle type seats arranged flush with the rear portion of a fuel tank have been observed to have a tendency to flair outwardly at the forward end thereof with use. Consequently, the seat separates from the fuel tank and spreads outwardly or is displaced either to the right or left. This spreading or lateral displacement disrupts the smooth transmission between the seat and the fuel tank and can become uncomfortable for a rider who is gripping the fuel tank with his or her knees. Eventually, this condition can become permanent and detracts from the appearance of the vehicle.

SUMMARY OF THE INVENTION

The present invention is directed to a saddle type seat assembly arranged flush with an associated fuel tank which is capable of maintaining a smooth transition between the seat and the tank.

To the foregoing end, attachment members may be provided to the rear portion of a fuel tank and engagement means are provided on the forward portion of the seat frame structure such that the forward seat frame structure is permanently held in an appropriate arrangement and remains in a flush arrangement with the tank. In this way, the forward portion of a saddle type seat employing the present invention is neither spread nor displaced to either the right or left with the rider in position or permanently with time.

In a further aspect of the present invention, vibration reducing rubber mounts may be interposed between the fuel tank and the saddle type seat to reduce engine vibration as well as vibration caused by vehicle movement.

Accordingly, it is an object of the present invention to provide an improved saddle type seat assembly for small vehicles. Other and further objects and advantages will appear hereinafter.

DETAILED DESCRIPTION OF THE PREFERRED EMBODIMENTS

Figure 1:
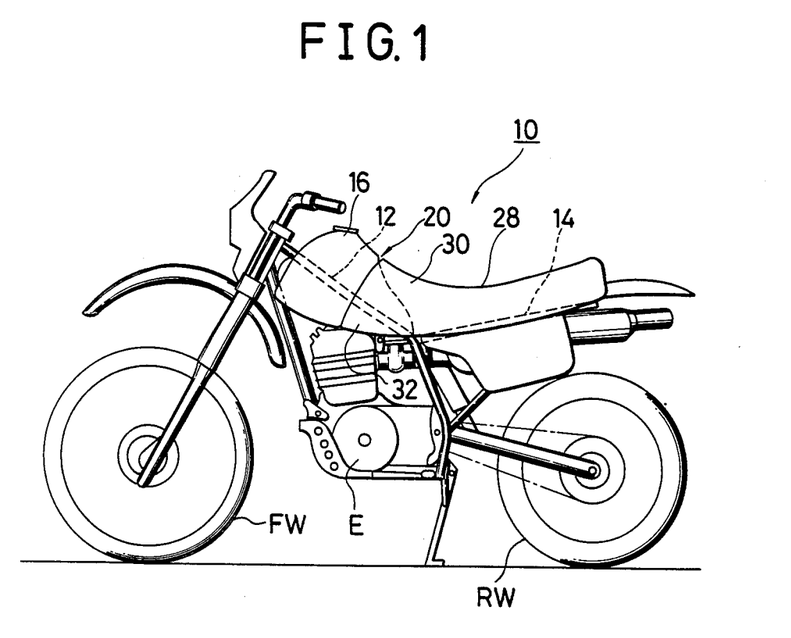
FIG. 1 is the left side view of a motorcycle incorporated with a seat retaining mechanism according to the present invention.

Turning in detail to the drawings, FIG. 1 illustrates a side view of a motorcycle 10. The motorcycle 10 includes an engine E placed between front and rear wheels FW, RW, respectively. A fuel tank 16 is conventionally placed at an upper location above the engine E and supported by a main frame 12. A saddle type seat 28 is placed rearwardly of the fuel tank 16 and is supported by a seat supporting frame 14.

Figure 2:
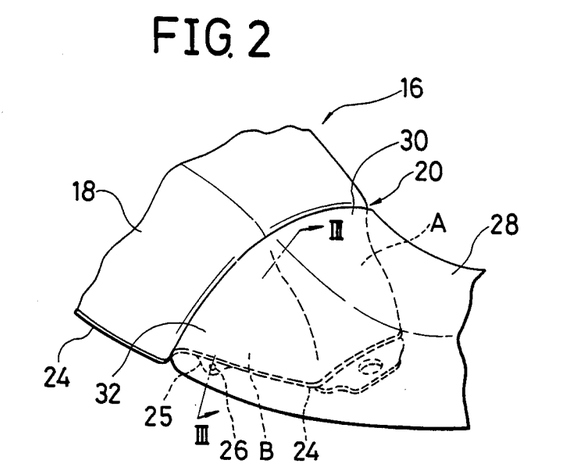
FIG. 2 is a prospective view showing a joint portion of a fuel tank and a saddle type seat of the embodiment of FIG. 1.

Looking to FIG. 2, an upper wall 18 of the fuel tank 16 is shown to be reduced at its rear portion to form a step portion 20 and a reduced rear portion. A front portion 30 of the saddle type seat 28 extends forwardly to cover the top wall A and both sidewalls B of the reduced portion. The front end of the saddle type seat 28 is placed abutting the step portion 20 such that the outer surface of the saddle type seat 28 and the outer surface of the main portion of the fuel tank are flush to provide a smooth transition therebetween.

Figure 3:
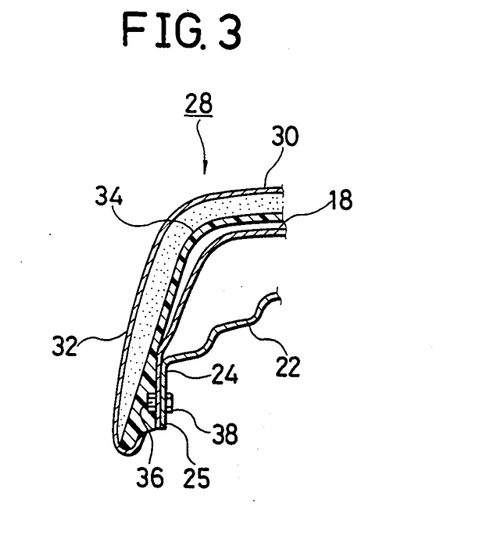
FIG. 3 is a cross-sectional view taken along line III—III of FIG. 2.

As seen in FIG. 3, an upper wall 18 and a lower wall 22 of the metal fuel tank 16 are joined together by seam welding at a right and left overlapping portions 24. An attachment member in the form of a projection piece 25 projects downwardly from the overlapping portion 24 at a location near the step portion 20. An identical projection piece 25 is preferably provided on the other side of the fuel tank as well. The projection piece 25 is formed with an opening 26 to receive and cooperate with engagement means associated with the saddle type seat 28.

An engagement means is provided on either side of the saddle type seat 28 to engage the attachment members 25. At the side portions 32 of the saddle type seat 28 a bottom plate 34 forms a seat frame structure. The bottom plate 34 is preferably made of resin material and has a nut 36 embedded therein. The plate 34 extends to cover the reduced sides B of the fuel tank 16 when assembled therewith. The side portions 32 of the straddle type seat 28 and the fuel tank 16 may then be firmly fixed by engaging a bolt 38 through the opening 26 with the nut 36.

With the foregoing construction assembled as shown, both the side portions 32 at the front portion 30 of the saddle type seat 28 are correctly postioned and fixed to the projection pieces 25 of the fuel tank 16. The side portions 32 will not be spread or deformed sideways when a rider sits on the seat 28. In addition, the front portion does not have a tendency to shift either right or left. Accordingly, even if the seat is used over an extended period, a smooth flush condition between the front portion of the seat and the fuel tank will be retained.

Figure 4:
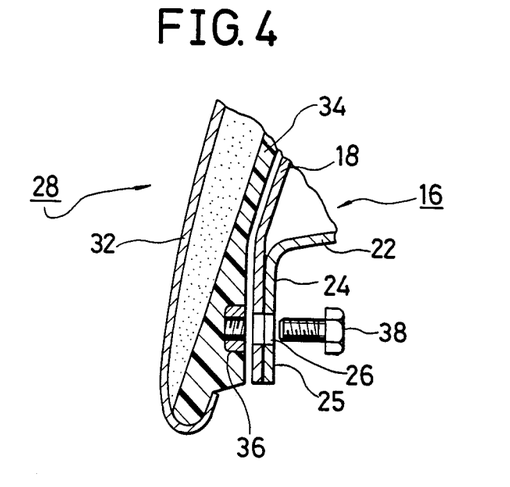
FIG. 4 is an enlarged fragmentary view of the cross section shown in FIG. 3.
Figure 5:
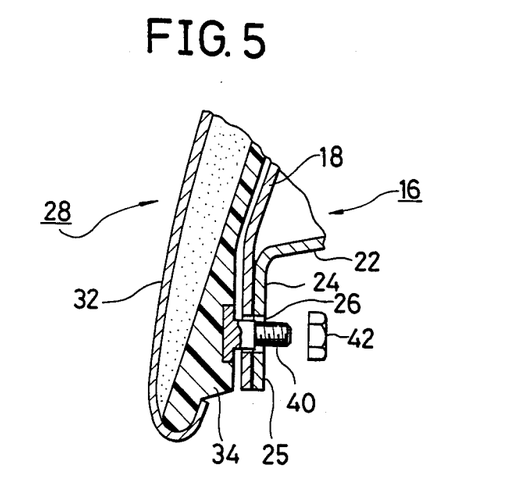
FIG. 5 is a view as in FIG. 4 illustrating a modified embodiment.

Illustrating a slight modification of the embodiment as specifically seen in FIGS. 3 and 4, FIG. 5 illustrates an arrangement having a bolt 40 located in the bottom plate 34. The side portions 32 of the saddle type seat 28 may then be fixed to the projection pieces 25 through a threaded engagement of the bolt 40 with a nut 42.

Figure 6:
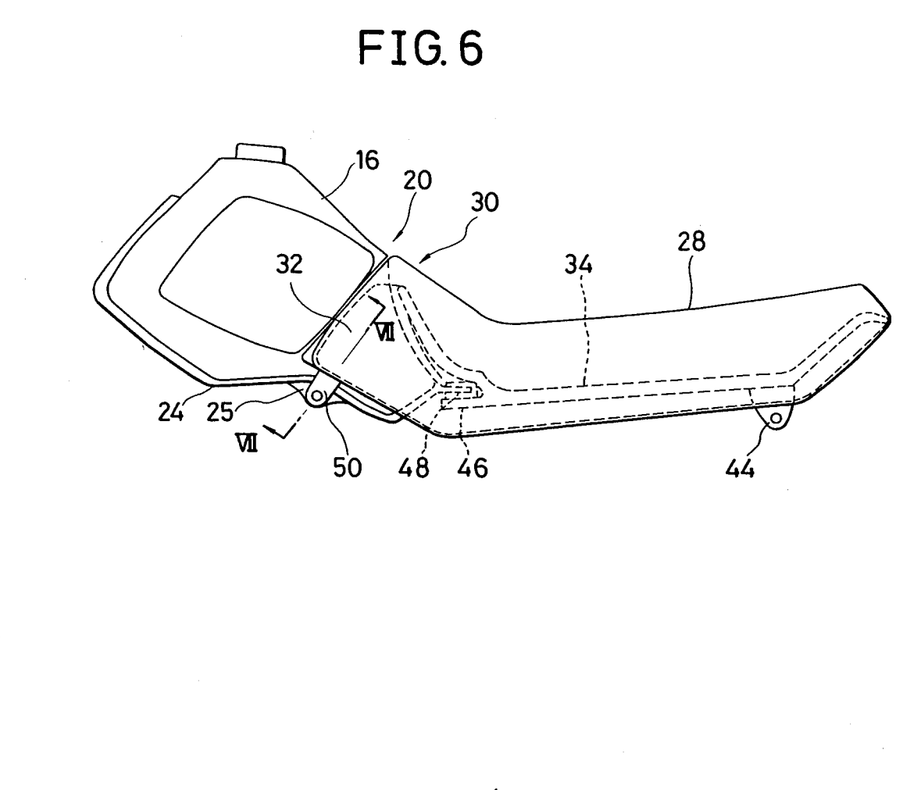
FIG. 6 is a side view of a fuel tank and a saddle type seat according to yet another embodiment of the present invention.
Figure 7:
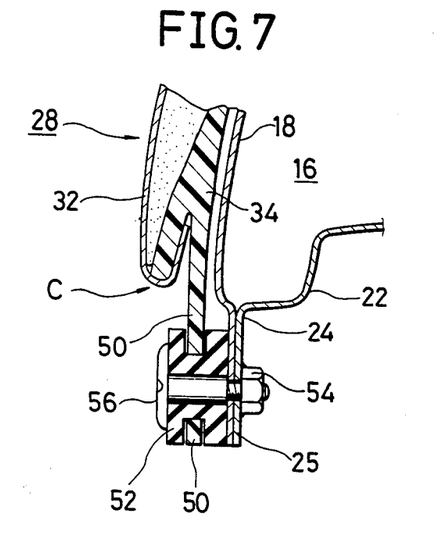
FIG. 7 is a cross-sectional view taken along line VII—VII of FIG. 6.

In the depiction of the embodiment of FIGS. 6 and 7, identical reference numbers refer to identical or equivalent elements of the prior embodiments. The saddle type seat 28 is engaged and fixed to a pair of right and left seat supporting frames (not shown) through a pair of right and left projections 44 formed on a rear portion of the bottom plate 34. A front portion of the saddle type seat 28 is secured through the employment of a projecting piece 46 forming a groove facing forwardly on the bottom plate 34. The projecting piece 46 receives a fixed projection piece 48 formed at the rear end of the fuel tank 16. The right and left side portions 32 at the front portion of the saddle type seat 28 are each provided with a retaining piece 50 extending downwardly passed the lower end C of the outer skin portion of the seat. The retaining piece 50 is attached and fixed to a projection piece 25 provided on the fuel tank 16. This attachment mechanism more specifically includes an opening at the lower end of the retaining piece 50. A vibration isolating rubber piece 52 in the form of a rubber grommet employs a peripheral groove such that the grommet 52 may be inserted into the opening in the retaining piece 50 and the periphery edge of the opening is received within the groove. A nut 54 is fixed by welding onto the projection 25. A bolt 56 having a large head is engaged with the nut 54 through the grommet 52. Thus, the retaining piece 50 of the saddle type seat 28 is fixed to the projection piece 25 of the fuel tank 16.

The employment of the rubber grommet 52 reduces vibration of the engine and of the vehicle body due to running of the vehicle.

The fuel tank itself is also fixed to the vehicle body through vibration isolating rubber members. Thus, vibration through the tank and to the saddle type seat may be substantially reduced. The rubber grommets 52 also reduce vibration noise between the tank 16 and the saddle type seat 28.

In addition to the retention of the saddle type seat 28 on the projection piece 25, side covers and air shrouds for directing air to the engine E and other devices may also be fixed thereto. Thus, the vehicle body structure may be simplified and costs reduced.

Figure 8:
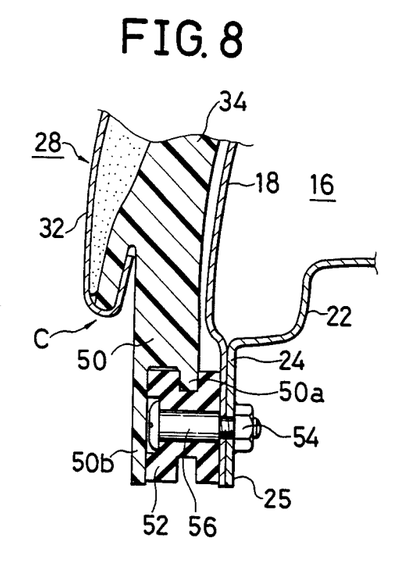
FIG. 8 is a view similar to that of FIG. 7 illustrating a modified embodiment of the seat retaining structure of FIG. 7.
Figure 9:
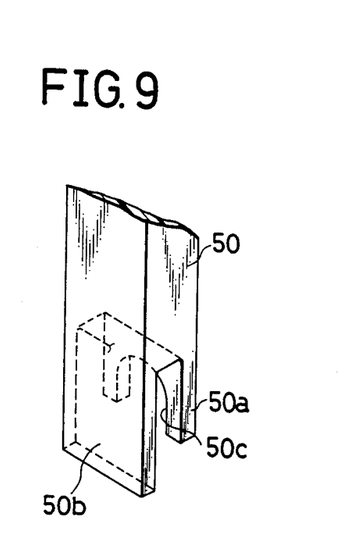
FIG. 9 is a perspective view showing an attachment means of FIG. 8.
Figures 10, 11:
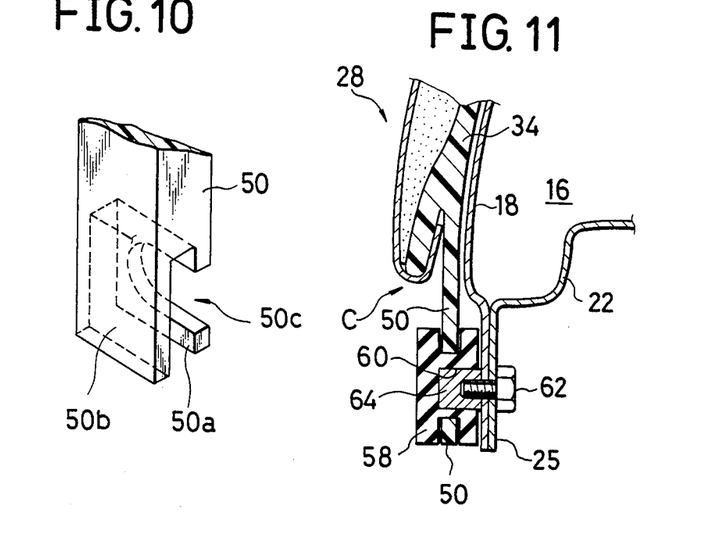
FIG. 10 is a perspective view similar to that of FIG. 9 illustrating a modified embodiment of the part shown in FIG. 9.
FIGS. 11 through 14 are cross-sectional views similar to the view of FIG. 7 illustrating other modified embodiments of the seat retaining structure of FIG. 7.

Turning then to certain other modified attachment devices which may be employed to retain the front end of the saddle type seat 28 on the fuel tank 16, reference is made to FIGS. 8 through 14. Identical and equivalent elements to those of the prior embodiments will be found to employ the same reference numerals. In FIGS. 8, 9 and 10, a lower end portion of a retaining piece 50 extends downwardly exceeding the lower end portion C of the outer seat structure. This extension of the retaining piece 50 is separated into an inner piece 50a and an outer piece 50b. A U-shaped cut 50c is formed in the inner piece 50a to receive the peripheral groove formed in the vibration isolating rubber piece or grommet 52. FIGS. 9 and 10 illustrate a different location for the cut 50c. The outer piece 50b acts to hide the bolt 56 to maintain a clean outer appearance.

Figure 12:
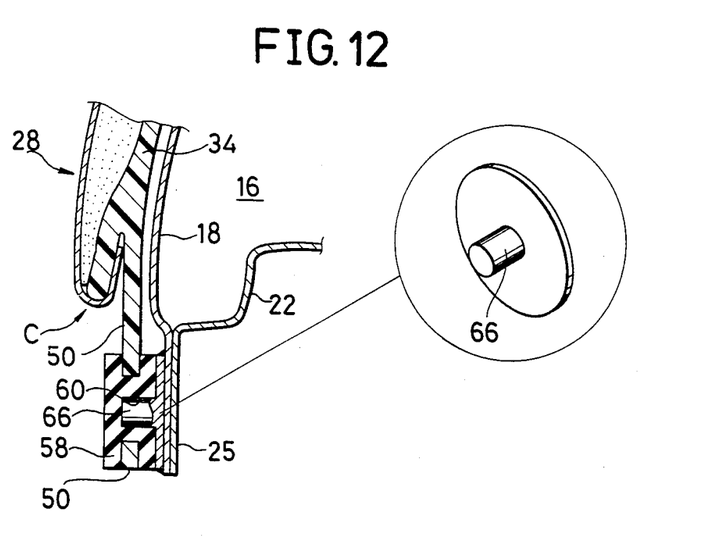
Figure 13:
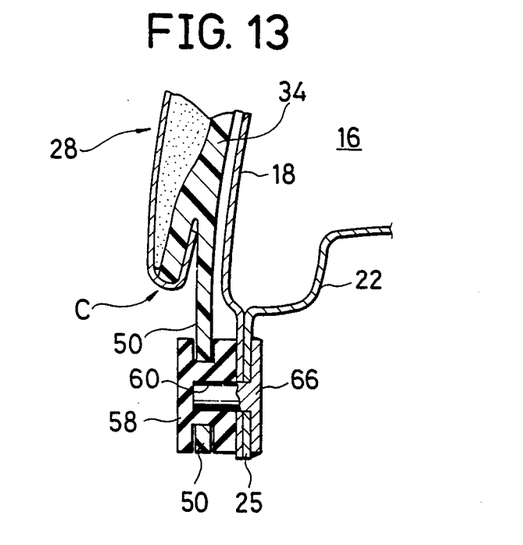
Figure 14:
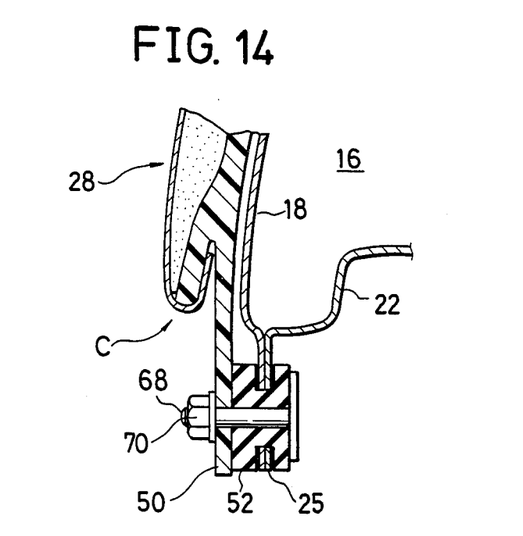

The device of FIG. 11 includes a blind hole 60 in a vibration isolating rubber member 58. A retaining plug 64 fixed to the projection piece 25 of the fuel tank 16 by a screw 62 extends into the blind hole 60. With this device, the attaching and detaching of the retaining piece 50 from the projection piece 25 can be simply effected by one touch. In FIG. 12, a device similar to that of FIG. 11 is illustrated. The blind hole 60 of the member 58 receives a flanged plug member 66 which is welded to the outer surface of the projection piece 25. In FIG. 13, the flange of the flanged plug 66 of FIG. 12 is held on the inner surface of the projection piece 25 and extends through a hole therein into the blind hole 60. FIG. 14 illustrates a somewhat reversed arrangement wherein the grommet 52 is positioned within a hole in the attachment member 25, a screw 68 extends through the grommet and a receiving hole in the retaining piece 50 and a nut 70 retains the parts in an assembled condition.

Thus, an improved motorcycle seat assembly for a saddle type seat mounted behind a fuel tank is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A saddle type seat assembly for a vehicle having a fuel tank, comprising:
    downwardly projecting attachment members including fastening holes affixed to either side of the rear portion of the fuel tank;
    a seat frame having the U-shaped cross section;
    a forward portion of said seat frame extending over a rearward portion of the fuel tank to said attachment members;
    engagement means affixed to said frame for engaging said attachment members; and
    bolts extending through said fastening holes to engage said engagement means.

2. The saddle type seat assembly of claim 1 wherein said engagement means includes nuts fixed to the forward lower portion of said seat frame to receive said bolts.

3. A saddle type seat assembly for a vehicle having a fuel tank, comprising:
    attachment members including downwardly extending projection pieces having openings therethrough affixed to either side of the rear portion of the fuel tank;
    a seat frame having a U-shaped cross section;
    a forward portion of said seat frame extending over a rearward portion of the fuel tank to said attachment members;
    engagement means including inwardly extending bolts in the forward lower portion of said seat frame; and
    nuts affixed in alignment with said openings to receive and affix said bolts.

4. A saddle type seat assembly for a vehicle having a fuel tank, comprising:
    attachment members affixed to either side of the rear portion of the fuel tank;

a seat frame a U-shaped cross section;

a forward portion of said seat frame extending over a rearward portion of the fuel tank to said attachment members;

engagement means including rubber grommets positioned between said attachment members and said seat frame for engaging said attachment members, said engaging means including retaining pieces extending downwardly from said seat frame and having openings formed therethrough for receiving said grommets; and said attachment members each including a fastener extending through said grommet and fixed to said fuel tank.

5. The saddle type seat assembly of claim 4 wherein each of said retaining pieces is formed with a first member having a U-shaped cut formed therein and a second, parallel member outwardly spaced from said first member and covering over said U-shaped cut.

6. A saddle type seat assembly for a vehicle having a fuel tank, comprising:

attachment members affixed to either side of the rear portion of the fuel tank and projecting downwardly therefrom;

a seat frame having a U-shaped cross section;

a forward portion of said seat frame extending over a rearward portion of the fuel tank to said attachment members;

engagement means affixed to said seat frame for engaging said attachment members, said engagement means including rubber grommets positioned between said attachment members and said seat frame;

openings in said attachment members to receive said grommets therein; and said engagement means including fasteners fixed to said seat frame and extending through and attaching said grommets.

* * * * *